(12) United States Patent
Karlsson

(10) Patent No.: US 8,702,576 B2
(45) Date of Patent: Apr. 22, 2014

(54) DEVICE AND METHOD FOR MONITORING AND ADJUSTING THE RADIAL POSITION OF AN INTERFACE LAYER IN A NOZZLE CENTRIFUGE

(75) Inventor: Per Karlsson, Hägersten (SE)

(73) Assignee: Alfa Laval Corporate AB, Tumba (SE)

( * ) Notice: Subject to any disclaimer, the term of this patent is extended or adjusted under 35 U.S.C. 154(b) by 0 days.

(21) Appl. No.: 13/635,771

(22) PCT Filed: Mar. 16, 2011

(86) PCT No.: PCT/EP2011/053939
§ 371 (c)(1),
(2), (4) Date: Nov. 23, 2012

(87) PCT Pub. No.: WO2011/113850
PCT Pub. Date: Sep. 22, 2011

(65) Prior Publication Data
US 2013/0065744 A1 Mar. 14, 2013

(30) Foreign Application Priority Data
Mar. 19, 2010 (EP) ..................... 10156998

(51) Int. Cl.
*B04B 1/12* (2006.01)
*B04B 11/02* (2006.01)

(52) U.S. Cl.
USPC .................. 494/1; 494/10; 494/27

(58) Field of Classification Search
USPC .......... 494/1–6, 10, 11, 23, 25–30, 56, 68–70
See application file for complete search history.

(56) References Cited

U.S. PATENT DOCUMENTS 2,532,792 A * 12/1950 Svensjo ........................... 494/1
2,628,023 A * 2/1953 Dahlstedt ........................ 494/2
(Continued)

FOREIGN PATENT DOCUMENTS

DE 3114482 A1 * 10/1982 ............... B04B 1/14
EP 2644278 A1 * 10/2013
(Continued)

OTHER PUBLICATIONS

International Search Report: mailed Jul. 14, 2011: PCT/EP2011/053939.

*Primary Examiner* — Charles E Cooley
(74) *Attorney, Agent, or Firm* — Birch, Stewart, Kolasch & Birch, LLP

(57) ABSTRACT

Device for monitoring and adjusting, in particular for fixing and securing, the radial position of an interface layer in a nozzle centrifuge for separating a light phase having a relatively low density and a heavy phase having a relatively high density from a mixture containing these two liquids and a solid, the nozzle centrifuge including a rotor 1-3 which is rotatable around a rotational axis R and which forms an inlet 9 for said mixture, a separating chamber 7 communicating with said inlet 9 and having a radially inner part 7a and a radially outer part 7b, nozzles 12 at the separating chamber distributed around the rotational axis R for throwing out the heavy phase and the solid, an outlet 13a, 13b, 14 for discharging the light phase, an overflow outlet 19 being radially delimited by a cover or level ring 20 for discharging the heavy phase, and an inlet 9; 25, 26 for supplying additional heavy phase to the centrifuge, characterized in that a sensor 24 is arranged in the flow path of the heavy phase 23 leaving the centrifuge for monitoring the magnitude of the flow and transmitting a corresponding signal such that the supply of additional heavy phase via the inlet 9 or 25, 26 can be adjusted in reply to the signal.

8 Claims, 1 Drawing Sheet

(56) References Cited

U.S. PATENT DOCUMENTS

| | | | |
|---|---|---|---|
| 2,906,449 A * | 9/1959 | Sullivan | 494/14 |
| 3,047,214 A | 7/1962 | Downing | |
| 3,167,509 A * | 1/1965 | Steinacker | 494/3 |
| 3,189,268 A * | 6/1965 | Nilsson | 494/10 |
| 3,255,958 A * | 6/1966 | Simon | 494/2 |
| 3,261,546 A * | 7/1966 | Gruver, Jr. | 494/37 |
| 3,301,476 A * | 1/1967 | Hemfort, Jr. | 494/3 |
| 3,396,910 A * | 8/1968 | Steinacker | 494/3 |
| 3,408,000 A * | 10/1968 | Nilson | 494/10 |
| 3,408,001 A * | 10/1968 | Nilsson | 494/3 |
| 3,410,479 A * | 11/1968 | Nilson | 494/3 |
| 3,445,061 A * | 5/1969 | Nilson | 494/3 |
| 3,494,545 A * | 2/1970 | Nilson | 494/1 |
| 3,508,704 A * | 4/1970 | Hemfort | 494/3 |
| 3,580,493 A * | 5/1971 | Jonsson | 494/2 |
| 3,593,915 A * | 7/1971 | Steinacker | 494/3 |
| 3,637,134 A * | 1/1972 | Nelson | 494/2 |
| 3,640,452 A * | 2/1972 | Thylefors | 494/1 |
| 3,642,196 A * | 2/1972 | Nilsson | 494/2 |
| 3,750,940 A * | 8/1973 | Nilsson | 494/3 |
| 3,752,389 A * | 8/1973 | Nilsson | 494/3 |
| 3,765,599 A * | 10/1973 | Hemfort | 494/29 |
| 3,825,176 A * | 7/1974 | Hemfort, Jr. | 494/3 |
| 3,938,734 A * | 2/1976 | Wilke | 494/11 |
| 3,976,242 A * | 8/1976 | Hemfort | 494/3 |
| 4,069,969 A * | 1/1978 | Tanaka | 494/3 |
| 4,092,859 A | 6/1978 | DeCarlo | |
| 4,141,246 A | 2/1979 | Randolph | |
| 4,149,668 A * | 4/1979 | Zurbruggen | 494/2 |
| 4,151,950 A * | 5/1979 | Gunnewig | 494/2 |
| 4,305,817 A * | 12/1981 | Kohlstette | 210/104 |
| 4,411,645 A * | 10/1983 | Tenthoff | 494/3 |
| 4,510,052 A * | 4/1985 | Eklof | 210/139 |
| 4,525,155 A * | 6/1985 | Nilsson | 494/3 |
| 4,622,029 A * | 11/1986 | Nilsson | 494/2 |
| 4,629,564 A * | 12/1986 | Pinato | 210/512.3 |
| 4,689,157 A * | 8/1987 | Tenthoff | 210/787 |
| 4,710,159 A * | 12/1987 | Gullers | 494/27 |
| 4,729,759 A * | 3/1988 | Krook et al. | 494/4 |
| 4,755,165 A * | 7/1988 | Gunnewig | 494/37 |
| 4,759,744 A * | 7/1988 | Krook | 494/35 |
| 4,820,256 A * | 4/1989 | Nordstrom | 494/3 |
| 4,840,612 A * | 6/1989 | Pallmar | 494/2 |
| 4,871,349 A * | 10/1989 | Tenthoff | 494/56 |
| 4,966,576 A * | 10/1990 | Schulz et al. | 494/56 |
| 5,104,371 A * | 4/1992 | Ajnefors | 494/27 |
| 5,199,938 A * | 4/1993 | Kohlstette et al. | 494/10 |
| 5,429,003 A | 7/1995 | McFarland | |
| 5,800,330 A * | 9/1998 | Modeer | 494/2 |
| 6,080,098 A * | 6/2000 | Borgstrom et al. | 494/27 |
| 6,358,193 B1 * | 3/2002 | Nyberg | 494/2 |
| 6,616,589 B1 * | 9/2003 | Maehans | 494/37 |
| 6,730,927 B1 | 5/2004 | Smith et al. | |
| 6,837,842 B1 * | 1/2005 | Dellden | 494/2 |
| 6,953,423 B2 * | 10/2005 | Maehens | 494/2 |
| 6,976,948 B1 * | 12/2005 | Hamblad | 494/37 |
| 7,485,084 B2 * | 2/2009 | Borgstrom et al. | 494/2 |
| 7,678,039 B2 * | 3/2010 | .ANG.strom | 494/37 |
| 7,758,488 B2 * | 7/2010 | Zettier et al. | 494/37 |
| 7,837,608 B2 * | 11/2010 | Klapper et al. | 494/37 |
| 8,192,342 B2 * | 6/2012 | Trager et al. | 494/1 |
| 8,337,378 B2 * | 12/2012 | Chan | 494/2 |
| 2005/0054505 A1 * | 3/2005 | Maehans | 494/6 |
| 2006/0225514 A1 | 10/2006 | Conquergood | |
| 2007/0082802 A1 * | 4/2007 | Klapper et al. | 494/2 |
| 2008/0171645 A1 * | 7/2008 | Borgstrom et al. | 494/2 |
| 2009/0137377 A1 * | 5/2009 | Astrom | 494/37 |
| 2009/0298666 A1 * | 12/2009 | Trager et al. | 494/10 |
| 2010/0081552 A1 * | 4/2010 | Chan | 494/3 |
| 2010/0184579 A1 * | 7/2010 | Trager | 494/56 |
| 2013/0029828 A1 * | 1/2013 | Haggmark et al. | 494/2 |
| 2013/0065744 A1 * | 3/2013 | Karlsson | 494/5 |

FOREIGN PATENT DOCUMENTS

| | | | |
|---|---|---|---|
| JP | 60-192217 A | 9/1985 | |
| JP | 07246349 A * | 9/1995 | B04B 1/14 |
| JP | 07284693 A * | 10/1995 | B04B 1/14 |
| JP | 2002119891 A * | 4/2002 | B04B 1/08 |
| JP | 2002166198 A * | 6/2002 | B04B 1/08 |
| WO | 86/01436 A1 | 3/1986 | |
| WO | WO 9103319 A1 * | 3/1991 | B04B 11/04 |
| WO | 96/34693 A1 * | 11/1996 | |
| WO | 00/37177 A1 | 6/2000 | |
| WO | 00/74858 A1 | 12/2000 | |
| WO | 2009/010630 A1 * | 1/2009 | |
| WO | 2009/010631 A1 * | 1/2009 | |
| WO | 2010/098714 A1 * | 9/2010 | |

* cited by examiner

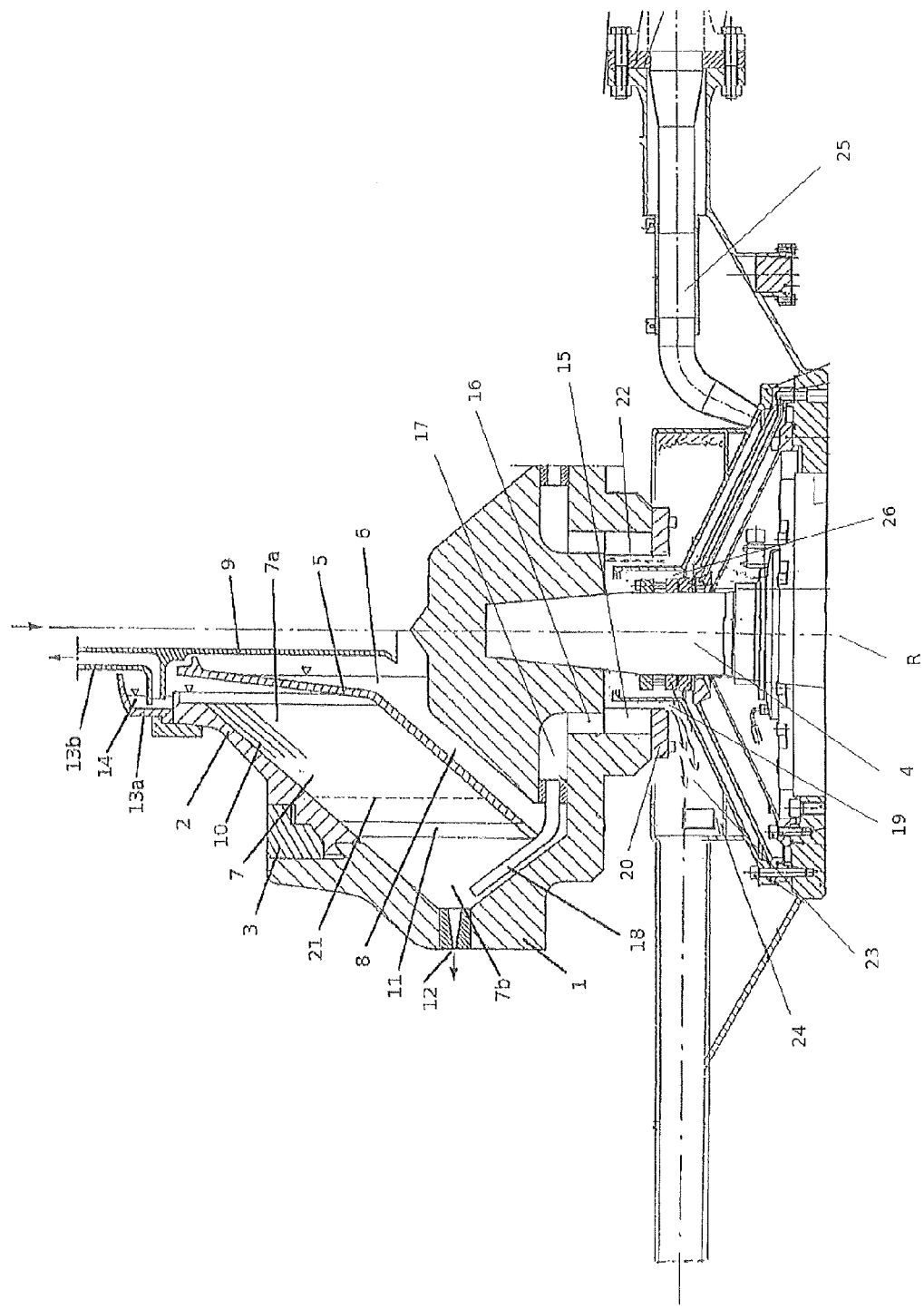

DEVICE AND METHOD FOR MONITORING AND ADJUSTING THE RADIAL POSITION OF AN INTERFACE LAYER IN A NOZZLE CENTRIFUGE

BACKGROUND OF THE INVENTION AND PRIOR ART

The present invention relates to a three-phase nozzle centrifuge for separating a light phase having a relatively low density, a heavy phase having a relatively high density and a solid phase from a mixture containing these three phases. The light and heavy phases may, for instance, be constituted by oil and water, resp., and the solid phase may, for instance, be constituted by sand. It is very important for a satisfactory separation that the interface layer between the light and heavy phases is placed correctly. The movement of this layer even a fraction of a centimeter in the centrifuge will substantially affect the separation results: A movement radially outward will produce drier oil and water containing some oil; a movement radially inward will produce oil with higher moisture content and more oil-free water; and a placement in a position radially as far out as possible will effect a larger amount of rupturing or breakage but without a substantially improved separation.

Generally, a centrifugal separator may have outlets for the separated liquids formed in several different ways. For example, the rotor may be provided with so-called overflow outlets for both of the liquids or an overflow outlet for one liquid and another kind of outlet for the other liquid, wherein the latter may be constituted, for instance, by a non-rotatable so-called paring disc or by nozzles situated in the surrounding wall of the rotor. Nozzles are used as a rule when the supplied mixture also contains solids which are heavier than the two liquids as in the present case. Then, separated solids together with part of the heavy liquid may be discharged through these nozzles placed at the periphery of the rotor, whereas the separated light liquid is discharged from a central part of the rotor through an overflow outlet or a paring disc. In these cases, the rotor may also form a space which communicates with the radially outer part of the separation chamber in such a way that during a separating operation it will contain separated heavy liquid but not separated light liquid. Excess separated heavy liquid which does not leave the separation chamber through said nozzles is then discharged from the rotor through this space.

In a nozzle centrifuge of the kind described above it may be difficult to maintain the interface layer which is formed in the rotor between the liquids separated therein at a predetermined radial level during a separating operation. However, keeping the radial level of the interface layer within a predetermined range is important for obtaining optimal separation results. One of the reasons is that an uncontrollable amount of separated heavy liquid leaves together with the separated solids through the so-called sludge outlet of the rotor; another reason is wear of the outlet nozzles which leads to higher outlet rates for the heavy liquid over the time. Thus, if the amount of heavy liquid leaving the rotor exceeds the amount of heavy liquid being introduced into the rotor together with the mixture to be treated therein, the interface layer in the separating chamber between light liquid and heavy liquid will move radially outwardly, with the result initially mentioned, i.e., separated light liquid being lost together with the separated heavy liquid leaving the rotor.

In particular, this applies to the cleaning of oil from sand and water in connection with recovery of oil from so-called tar sands. In this connection, nozzle centrifuges are used in several separating steps. In a first separating step, a mixture of oil, water and sand residues is introduced into a nozzle centrifuge. The sand and the main part of the supplied water leave the centrifuge rotor through its nozzles, whereas a certain amount of water is removed from the rotor through a central overflow outlet. Separated oil is conducted out of the rotor from a central part thereof, for example, through a paring disc, and is pumped further to another nozzle centrifuge to go through a second separating step. Water is added separately in excess or in a balanced manner with a VCD ("virtual capacity drum") such that the interface layer formed in the separating chamber of the rotor between oil and water shall not be displaced radially outwardly, even after many hours' operation of the centrifugal separator when its nozzles have become worn of the outflowing sand and, therefore, let out more water than at the beginning of the separating operation as already explained above.

After the first separating step, the oil still contains residues of sand and water, however. In order to enhance the separation result, control equipment comprising a pressure vessel has been developed for controlling the separating operation in the second separating step. By means of this control equipment, it is possible to avoid continuous addition of an excess amount of water to the mixture being introduced into the centrifugal rotor. Instead, water is introduced into the separating chamber of the rotor through a space in the rotor of the kind previously described (i.e., a space communicating only with the radially outer part of the separating chamber) only when needed. Through the same space, water is also removed from the rotor when excess water enters together with the oil to be cleaned which excess water cannot leave the rotor through the sludge outlet nozzles. It should be noted that it is also possible to supply additional water already in the first step—in this case, the difference between the first and second steps is that, during the first step, compensation water is added at certain abnormal conditions, whereas, in the second step, the supply of water is continuously regulated. In any case, the control equipment which has been developed is expensive and complicated. For each one of a great number of nozzle centrifuges it comprises a pressure vessel for water, the lower part of which communicates with a liquid paring disc (which is situated in said space in the rotor of the centrifugal separator) through a conduit for the introduction of water into or discharge of water out of the rotor. In the upper part of the pressure vessel a gas pressure is maintained (usually by means of nitrogen gas) the magnitude of which is continuously controlled in response to the amount of water which is present in the pressure vessel, so that the liquid pressure at the bottom of the pressure vessel (and, thus, within the conduit through which the pressure vessel communicates with said space in the centrifugal rotor) is always kept constant at a predetermined value. The constant value of the liquid pressure in said conduit corresponds to a desired radial level of the interface layer formed in the separating chamber of the rotor between separated oil and separated water. If the interface layer moves radially outwardly from the desired level the pressure in said space in the rotor drops, with the result that water is pressed from the pressure vessel through said conduit into the rotor until the interface layer has returned to the desired radial level. A level sensor in the pressure vessel is adapted to initiate the supply of new water to the pressure vessel upon need, so that it will never be empty of water. If the interface layer in the separating chamber of the rotor starts to move radially inwardly from the desired level, the pressure in said space in the rotor increases, with the result that excess water is pressed from this space through said conduit into the pressure vessel. When the liquid level in the pressure vessel has risen to an upper limit level, a bottom outlet of the pressure vessel is opened for release of water therefrom.

WO 00/37177 discloses a control equipment of this kind which is amended in that respect that the pressure source for control liquid which is part of the supply device is not integrated in the discharge device. The separated heavy liquid and/or control liquid leaving the rotor need not be accumulated at an elevated pressure and, consequently, no pressure vessel is needed. Furthermore, there is no need for a system for compression of gas and for control of the pressure of such a gas. Instead, the pressure source may be constituted by a simple liquid pump and the whole control of the supply of controlling liquid and discharge of separated heavy liquid and/or control liquid can be performed by means of one or more so-called constant pressure valves. If a container is needed for a buffer amount of control liquid, such a container may be free of pressure and common to several centrifugal separators.

Another approach for controlling the location of the interface layer—i.e., for compensating possible loss or excess of the heavy liquid—does not make use of pressure vessels or valves for actively moving the interface layer. Instead, the radial position of the interface layer is maintained by providing the outlet for the lighter liquid phase with an overflow outlet in the shape of a so-called level ring having an opening surrounding the rotation axis and the outlet for the heavier liquid phase with an overflow outlet also in the shape of a level ring having an opening surrounding the rotational axis, wherein additional auxiliary heavier liquid is supplied, for example, through the outlet for the heavier liquid phase. Since the radial position of the interface layer is governed by the relative radial positions of the inner edges of the level rings with respect to each other, i.e., the ratio of their openings, adjustment of the interface layer could be achieved by stopping the centrifugal separator and replacing one or both level rings by a level ring or rings having another radius for the respective overflow outlet. This would have to be done several times before the right level ring or rings are found, i.e., a level ring or rings having a radius for the respective overflow outlet leading to the right position of the interface layer and, thus, to a satisfactory separation result. Obviously, this would constitute a difficult and time consuming operation.

In order to overcome this problem, U.S. Pat. No. 3,047,214 proposes to choose appropriate level rings for the centrifuge in view of the particular separation process at the beginning and then to adjust the radial position of the interface layer by adding the auxiliary heavier liquid at variable density. The interface is moved radially inwardly by increasing the density of the auxiliary heavier liquid—for example, by dissolving salt of a higher density therein—or radially outwardly by decreasing the density of the auxiliary heavier liquid—for example, by dissolving a liquid with lower density therein such as an alcohol.

Still another approach to overcome the problem of correctly positioning the interface layer is disclosed in WO 00/74858. Here, the centrifugal separator is provided with a paring device which is movable between different radii in an outlet chamber. This paring device is initially (i.e., when the separator is empty) moved to a radial inner position in the outlet chamber and then (after the mixture has entered the separator) it is moved towards the free liquid surface in the outlet chamber until the paring device reaches the liquid surface where it is prevented from moving further radially outwardly—this substantially corresponds to a wanted position of the interface layer.

All these approaches still have drawbacks, however. For example, the active approach with pressure vessels or valves results in considerable generation of erosion and heat in the discharge because the stationary discharge device is partly immersed in the rotating liquid body in the outlet chamber. The approaches with level rings or movable paring devices do not offer an acceptable control of the radial level of the interface layer because the feeding of additional heavy phase (i.e., water) is not accurately monitored. In addition thereto, the level ring approach leads to a very high consumption of auxiliary liquid and power because excess auxiliary heavier liquid which is not admitted to the separator is disposed of and, thus, wasted. Finally, the kind of separator in question also plays an important role when choosing detailed design options: The problem and type of interface control for intermittently discharging centrifuges is quite different from the problem and type of interface control for nozzle centrifuges which are designed for continuous discharge of solids as well as part of the heavy phase.

SUMMARY OF THE INVENTION

Accordingly, it is an object of the present invention to provide a nozzle centrifuge of the level ring type offering better control of the interface layer with less process water consumption and, thus, less power consumption and less erosion.

This object is achieved by a device for monitoring and adjusting, in particular for fixing and securing, the radial position of an interface layer in a nozzle centrifuge for separating a light phase having a relatively low density and a heavy phase having a relatively high density from a mixture containing these two liquids and a solid, the nozzle centrifuge including a rotor which is rotatable around a rotational axis and which forms an inlet for said mixture, a separating chamber communicating with said inlet and having a radially inner part and a radially outer part, nozzles at the separating chamber distributed around the rotational axis for throwing out the heavy phase and the solid, an outlet for discharging the light phase, an overflow outlet being radially delimited by a cover or level ring for discharging the heavy phase, and an inlet for supplying additional heavy phase to the centrifuge, characterized in that a sensor is arranged in the flow path of the heavy phase leaving the centrifuge for monitoring the magnitude of the flow and transmitting a corresponding signal such that the supply of additional heavy phase via the inlet 25, 26 is adjusted in reply to the signal to keep the radial level of the interface layer within a predetermined range.

Further advantages are achieved by the features as defined in the dependent claims.

BRIEF DESCRIPTION OF THE DRAWING

The present invention will now be explained in more detail by means of preferred embodiments which are disclosed as examples, and with reference to the attached drawing, wherein The Figure shows a centrifugal separator with openings, level rings at the light and heavy phase outlets and the sensor according to the invention.

BRIEF DESCRIPTION OF THE PREFERRED EMBODIMENTS OF THE INVENTION

The centrifugal rotor in the Figure includes a rotor body having a lower part 1 and an upper part 2, which parts are connected with each other by means of a lock ring 3. The rotor is supported at the top of a vertical drive shaft 4, connected with the lower rotor body part 1, and is rotatable around a rotational axis R.

Within the rotor there is a so-called distributor 5 which divides the rotor interior into a central inlet chamber 6 and an annular separating chamber 7 extending around the distributor and having a radially inner part 7a and a radially outer part 7b. The distributor 5 rests on the central portion of the lower rotor body part 1 through radially and axially extending wings (not shown) which are distributed around the rotational axis R of the rotor. Through channels 8, delimited between said wings, the inlet chamber 6 communicates with the separating chamber 7. A stationary inlet pipe 9 extends from above axially into the rotor and opens in the inlet chamber 6.

Within the separating chamber 7 there is arranged a conventional set of conical separation discs 10 which are kept in their axial position between the upper part 2 of the rotor body and the lower part of the distributor 5. Each separation disc 10, like the lower part of the distributor 5, has at its outer periphery a number of recesses distributed around the rotational axis R. Axially aligned recesses of this kind are illustrated at 11.

At the radially outermost part of the separating chamber 7, the lower rotor body part 1 carries several nozzles 12 distributed around the rotational axis R of the rotor. Each nozzle 12 has a through channel through which liquid and finely divided solids may be thrown out from the separating chamber 7.

As seen in the Figure, the nozzles 12 are unblocked and continuously open to throw out the heavy phase liquid and the solid during operation of the centrifuge.

The upper rotor part 2 carries a central annular cap 13a, which on its inside delimits an annular outlet chamber 14 open radially inwardly towards the rotational axis of the rotor. The stationary inlet pipe 9 supports on its outside an outlet member 13b in the form of a so-called paring disc which extends radially outwardly into the outlet chamber 14.

In the lower part 1 of the rotor body there is delimited an annular space 15 which is open radially inwardly towards the rotor rotational axis R. The space 15 communicates with the radially outer part 7b of the separating chamber 7 through channels 16 and 17 and several pipes 18 distributed around the rotational axis R. The bottom of the space 15 forms an overflow outlet 19 which is delimited radially by a second level ring 20.

A vertical dotted line 21 in the separating chamber 7 indicates a certain radial level therein.

The centrifugal rotor in the Figure is suitable for treatment of a mixture of oil and water and solids suspended therein. The mixture is to be supplied to the rotor through the inlet pipe 9 and be forwarded from the inlet chamber 6 through the channels 8 to the separating chamber 7. Through distributing channels formed by the recesses 11 in the separating discs the mixture is distributed between the various interspaces between the separating discs 10, where the different mixture components are separated from each other. Thus, separated oil flows radially inwardly and further out of the rotor through the outlet chamber 14 and the outlet member 13b, whereas senarated solids and water leave the rotor through the nozzles 12.

If the amounts of water and oil which leave the rotor through the nozzles 12 and the overflow/heavy phase outlet 19 (which is delimited by the second level ring 20), resp., equal the amounts of water and oil forming a part of the mixture supplied to the rotor, an equilibrium will come up in which an interface layer between separated oil and separated water is formed and maintained at the radial level 21 in the separating chamber 7. In this case, no liquid flows out of the rotor or into the rotor. In a situation of equilibrium of the described kind, it is presumed that free liquid surfaces are formed in the various chambers and spaces of the rotor at certain radial levels. It is further presumed that separated solids leave the rotor through the nozzles 12 without blocking them for outflowing separated water.

Because of wear of the nozzles 12 and/or variations of the amount of water and oil in the mixture supplied to the rotor, it is impossible in practice, however, to maintain said interface layer between oil and water in the separating chamber 7 at said radial level 21 or even within a predetermined radial range around this level without use of a special control equipment. As already mentioned, one known way to secure the radial position of the interface layer within a predetermined range consists in supplying additional water.

The Figure also shows the heavy phase (i.e., water) outlet 19 which is delimited by the second level ring 20. A free heavy phase surface is created at 22, wherein the water actually leaving the heavy phase outlet 19 is denoted by 23. According to the present invention, a sensor 24 is provided at the heavy phase outlet, wherein the sensor is arranged in such a way that it is hit by the water 23 leaving the heavy phase outlet. In this way, the magnitude of the flow of water 23 leaving the heavy phase outlet can be monitored and a corresponding signal can be transmitted. This signal is received by means (not shown) which adjust the feed of additional water—for example, via water inlet 26 which is supplied by water inlet connection 25—in reply to this signal. If the flow rate of water 23 leaving the heavy phase outlet 19 decreases below a predetermined value, a corresponding signal is transmitted to the adjusting means and water will be added through water inlet 26 at a corresponding flow rate in order to avoid a break of the water seal. It is advantageous to place the sensor as close to the heavy phase outlet as possible in order to get the most accurate monitoring results.

Providing a sensor in the path of the water 23 leaving the heavy phase outlet according to the present invention has several advantages. Firstly, the supply of additional water is much more accurate than in the prior art because it is performed directly in reply to the signal of the sensor 24 monitoring the water 23 which is actually leaving the heavy phase outlet—this leads to better separation results. Secondly, no water is wasted. In the prior art, additional water was supplied without feedback information on the water 23 actually leaving the heavy phase outlet—consequently, water which was not needed (and, thus, not admitted to the centrifuge) was disposed of. According to the present invention, this waste of water does not occur and there is less water consumption. Consequences of such minimized additional water inflow are less power consumption and also less erosion.

Suitable sensors are already known from the art and can consist in a microphone, a paddle, a stretched wire or the like that is hit by the liquid leaving the rotor.

In another embodiment, additional water is not supplied through the water inlet 26 of the water inlet connection 25 at the bottom of the centrifuge, but through the inlet pipe 9—for example, via a separate water channel which is coupled to the feed inlet pipe 9. Accordingly, the water inlet connection 25 with the water inlet 26 is not needed—the bottom chamber for collecting discharged heavy phase can be maintained, however.

Various other modifications can be made without leaving the inventive concept. For example, the arrangement of the light phase outlet described above as annular cap 13, outlet member 13b and outlet chamber 14 is not essential to the functioning of the invention and can be replaced by a different arrangement.

The invention claimed is:

1. A nozzle centrifuge that adjusts a radial position of an interface layer in the nozzle centrifuge for separating a light phase liquid having a relatively low density and a heavy phase liquid having a relatively high density from a mixture containing the light phase liquid, the heavy phase liquid, and a solid, the nozzle centrifuge comprising:
   a rotor, said rotor being rotatable around a rotational axis and forming an inlet for said mixture;
   a separating chamber communicating with said inlet and having a radially inner part and a radially outer part;
   nozzles at the separating chamber distributed around the rotational axis, said nozzles being unblocked and continuously open to throw out the heavy phase liquid and the solid during operation of the nozzle centrifuge;
   an outlet for discharging the light phase liquid;
   an overflow outlet being radially delimited by a cover or level ring for discharging the heavy phase liquid;
   an inlet for supplying additional heavy phase liquid to the separating chamber; and
   a sensor, said sensor being arranged in a flow path of the heavy phase liquid leaving the separating chamber for monitoring the magnitude of the flow and transmitting a corresponding signal,
   wherein supply of the additional heavy phase liquid via the inlet is adjusted in reply to the signal to maintain the interface layer at a predetermined radial level.

2. The nozzle centrifuge according to claim 1, wherein the sensor is a microphone.

3. The nozzle centrifuge according to claim 1, wherein the sensor is a paddle.

4. The nozzle centrifuge according to claim 1, wherein the sensor is a stretched wire.

5. The nozzle centrifuge according to claim 1, wherein the inlet for supplying the additional heavy phase liquid to the centrifuge is a water inlet connection with a water inlet at the bottom of the nozzle centrifuge.

6. The nozzle centrifuge according to claim 1, wherein the rotor further comprises an upper part and a lower part, an annular space being defined by the lower part and being in communication with the separating chamber, the annular space opening radially inwardly towards the rotational axis of the rotor, and a bottom of the annular space forming the overflow outlet.

7. The nozzle centrifuge according to claim 1, wherein the overflow outlet is continuously open to discharge the heavy phase liquid during operation of the nozzle centrifuge.

8. A nozzle centrifuge that maintains a radial position of an interface layer in the nozzle centrifuge for separating a light phase liquid having a relatively low density and a heavy phase liquid having a relatively high density from a mixture containing the light phase liquid, the heavy phase liquid, and a solid, the nozzle centrifuge comprising:
   a rotor, said rotor being rotatable around a rotational axis and forming an inlet for said mixture;
   a separating chamber communicating with said inlet;
   nozzles in communication with the separating chamber, outlets of said nozzles being located on an outer circumferential surface of said rotor, said nozzles being unblocked and continuously open to throw out the heavy phase liquid and the solid during operation of the nozzle centrifuge;
   an outlet in communication with the separating chamber for discharging the light phase liquid, said outlet being located at a top of said rotor;
   an overflow outlet in communication with the separating chamber for discharging the heavy phase liquid, said overflow outlet being located at a bottom of said rotor, below said nozzles;
   an inlet in communication with the separating chamber for supplying additional heavy phase liquid to the separating chamber; and
   a sensor, said sensor being arranged in a flow path of the heavy phase liquid leaving the separating chamber through the overflow outlet for monitoring the magnitude of the flow and transmitting a corresponding signal,
   wherein supply of the additional heavy phase liquid via the inlet is adjusted in reply to the signal to maintain the interface layer at a predetermined radial level.

* * * * *